Figure 1:
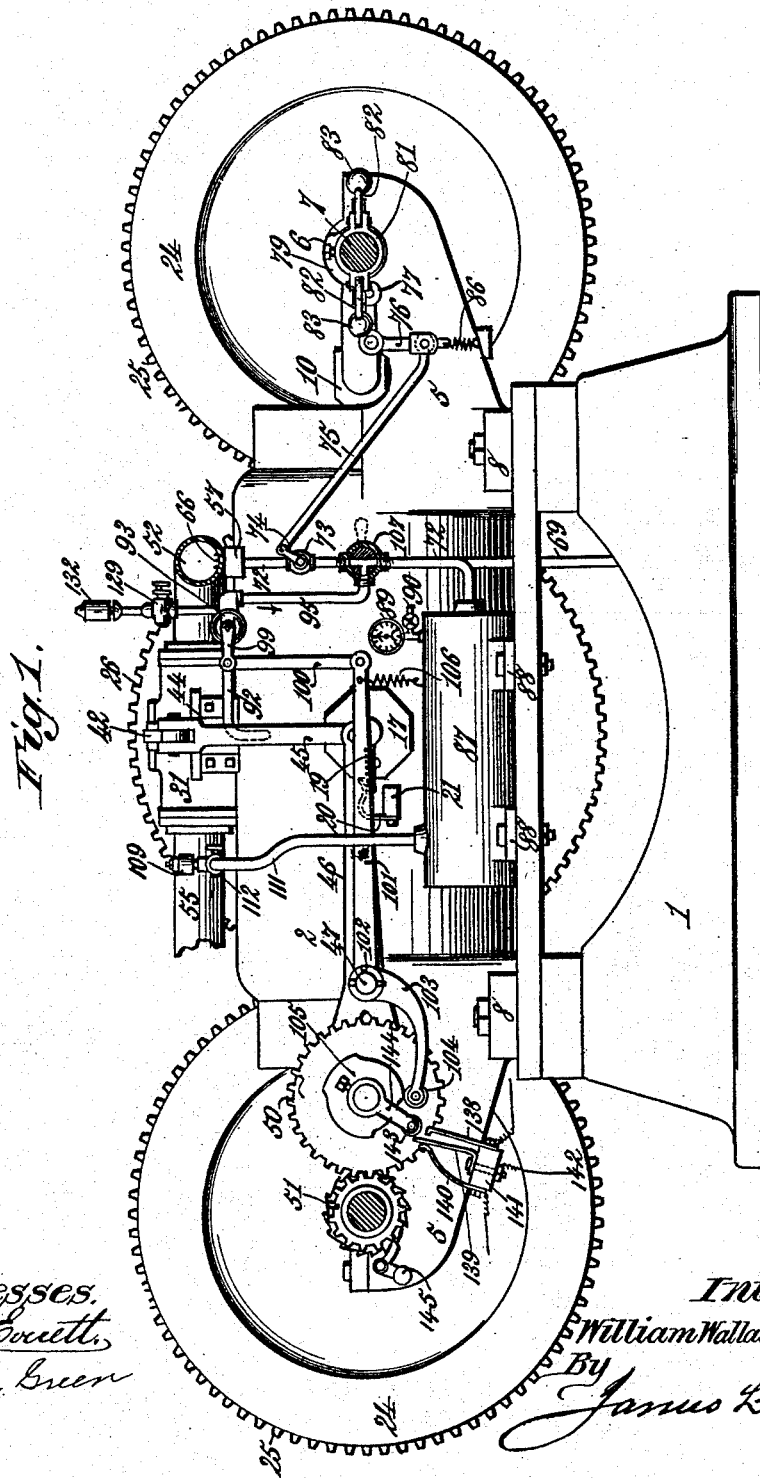

(No Model.)  5 Sheets—Sheet 1.

W. W. GRANT.
GAS OR VAPOR ENGINE.

No. 553,460.  Patented Jan. 21, 1896.

Witnesses.
Robert Cowett.
Thos. A. Green.

Inventor.
William Wallace Grant.
By James L. Norris.
Atty.

(No Model.)  5 Sheets—Sheet 2.

W. W. GRANT.
GAS OR VAPOR ENGINE.

No. 553,460.  Patented Jan. 21, 1896.

Witnesses.

Inventor.
William Wallace Grant.
By James L. Norris.
Atty.

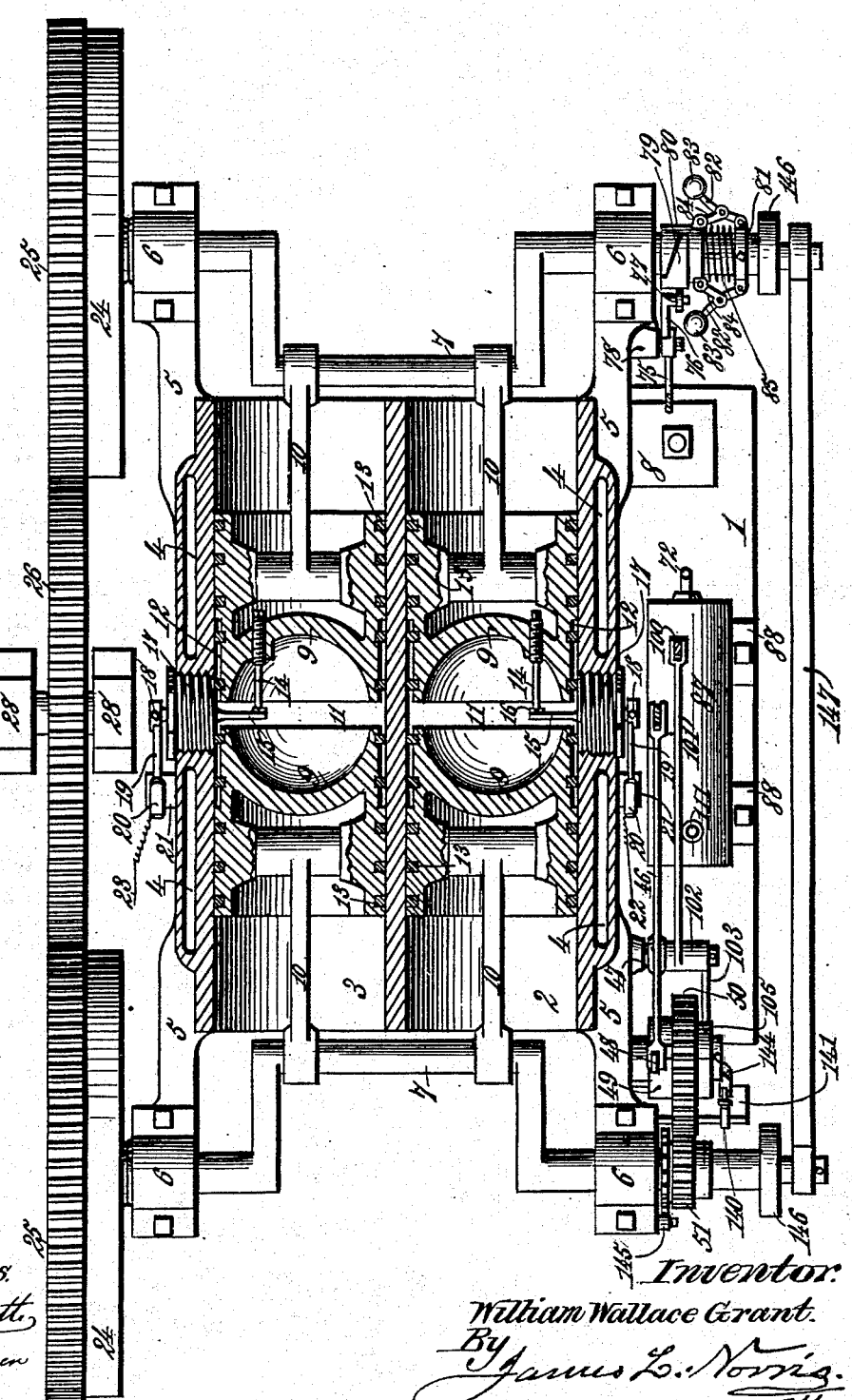

(No Model.) 5 Sheets—Sheet 4.
W. W. GRANT.
GAS OR VAPOR ENGINE.
No. 553,460. Patented Jan. 21, 1896.
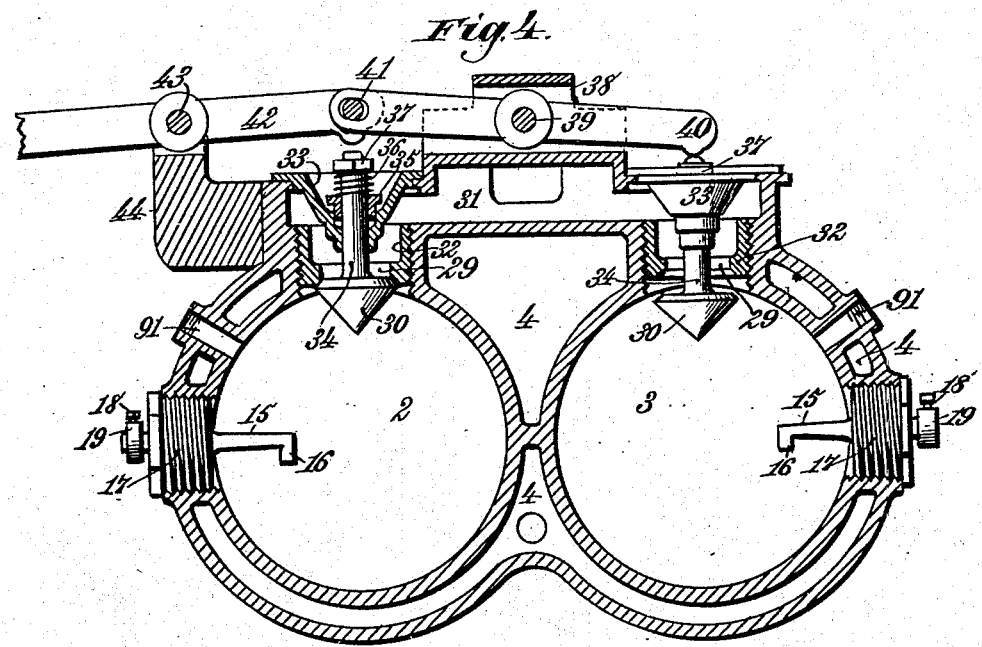
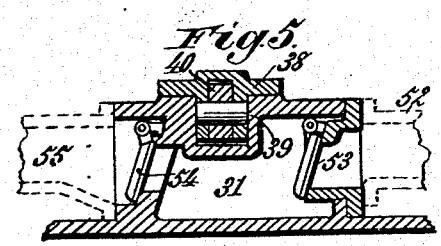
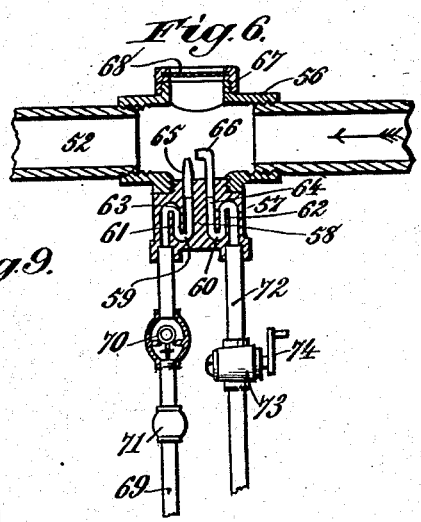
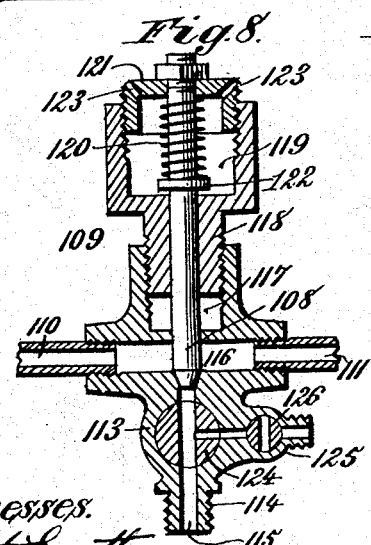
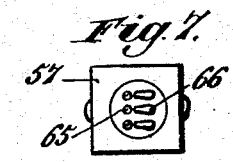
Witnesses.
Inventor:
William Wallace Grant
By James L. Norris,
Atty.

(No Model.) 5 Sheets—Sheet 5.
W. W. GRANT.
GAS OR VAPOR ENGINE.
No. 553,460. Patented Jan. 21, 1896.
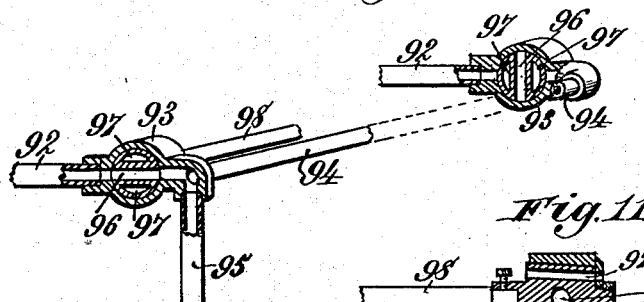
Fig. 10.
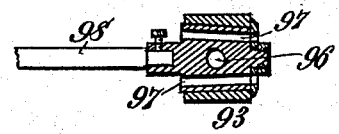
Fig. 11.
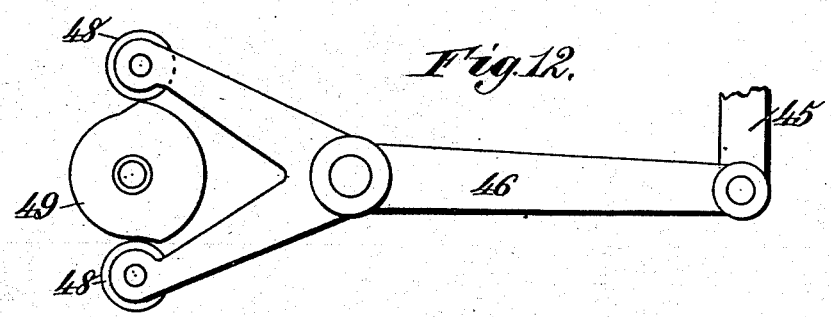
Fig. 12.
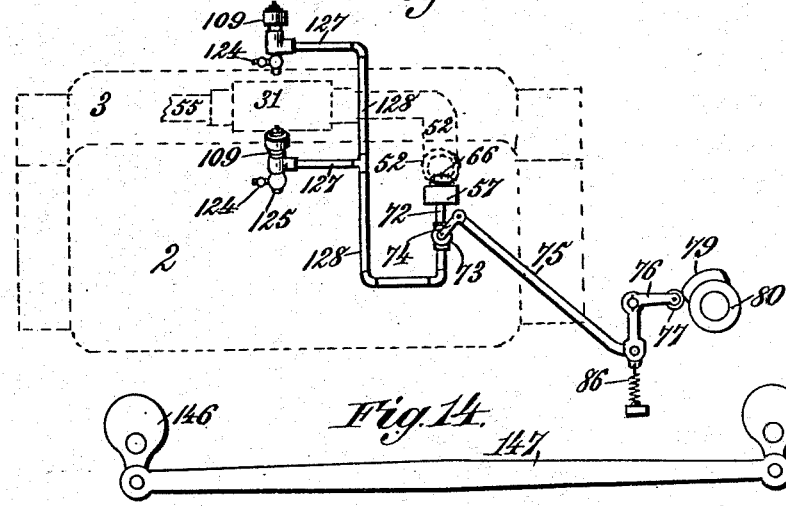
Fig. 13.
Fig. 14.
Witnesses.
Robert Everett
Thos. A. Green
Inventor:
William Wallace Grant.
By James L. Norris.
Atty.

UNITED STATES PATENT OFFICE.

WILLIAM WALLACE GRANT, OF BROOKLYN, NEW YORK.

GAS OR VAPOR ENGINE.

SPECIFICATION forming part of Letters Patent No. 553,460, dated January 21, 1896.

Application filed November 24, 1894. Serial No. 529,880. (No model.)

*To all whom it may concern:*

Be it known that I, WILLIAM WALLACE GRANT, a citizen of the United States, residing at Brooklyn, in the county of Kings and State of New York, have invented new and useful Improvements in Gas or Vapor Engines, of which the following is a specification.

My invention relates to gas or vapor engines of that type, more particularly, in which twin power-cylinders and their pistons are arranged for joint operation in such manner that while expansion is taking place in one cylinder, incident to explosion of a gas or vapor therein, the other cylinder will be taking in an explosive charge, compression of a charge in one cylinder being accomplished during exhaust from the other, and explosion in the charged cylinder being effected, preferably, by passage of an electric spark at or just after commencement of the expansion stroke.

The invention comprises a twin-cylinder engine in which each power-cylinder has a single charging and exhaust port controlled by a normally-seated valve that opens and closes in alternation with the corresponding valve of the other cylinder, and in which the said ports are adapted to communicate with an induction and exhaust chamber that is common to both cylinders. The inlet and exhaust port is so located as to permit the employment in each cylinder of two simultaneously approaching and receding pistons having a synchronous action with the pistons in the other cylinder, and geared therewith to respective cranks on shafts at opposite ends of the engine. For rendering the charge of either cylinder explosive, there is provided an injector or atomizer supplied with gasoline or other hydrocarbon or explosive-rendering body, either liquid or gaseous, that is sprayed or diffused under the action of a blast into the main volume of air, gas, or vapor with which the engine-cylinders are to be alternately charged. In order to produce or develop the injector-blast, it is my purpose to utilize a portion of the gases from the power-cylinders, alternately, and with this object in view I may take the gases of compression or the gases of expansion, either separately or together, and therefore the engine may be provided with means for utilizing either or both of these gases in the injector or atomizer blast; or it may be only furnished with devices for producing the blast with one of these gases, as may be preferred. The engine is also provided with mechanism for controlling an electric circuit in such manner as to produce an explosion at each revolution of the engine crank-shafts, first in one cylinder and then in the other, at alternate revolutions.

To these several ends my invention consists in the features of construction and novel combinations of parts in an explosive gas or vapor engine, as hereinafter described and claimed.

Figure 2:
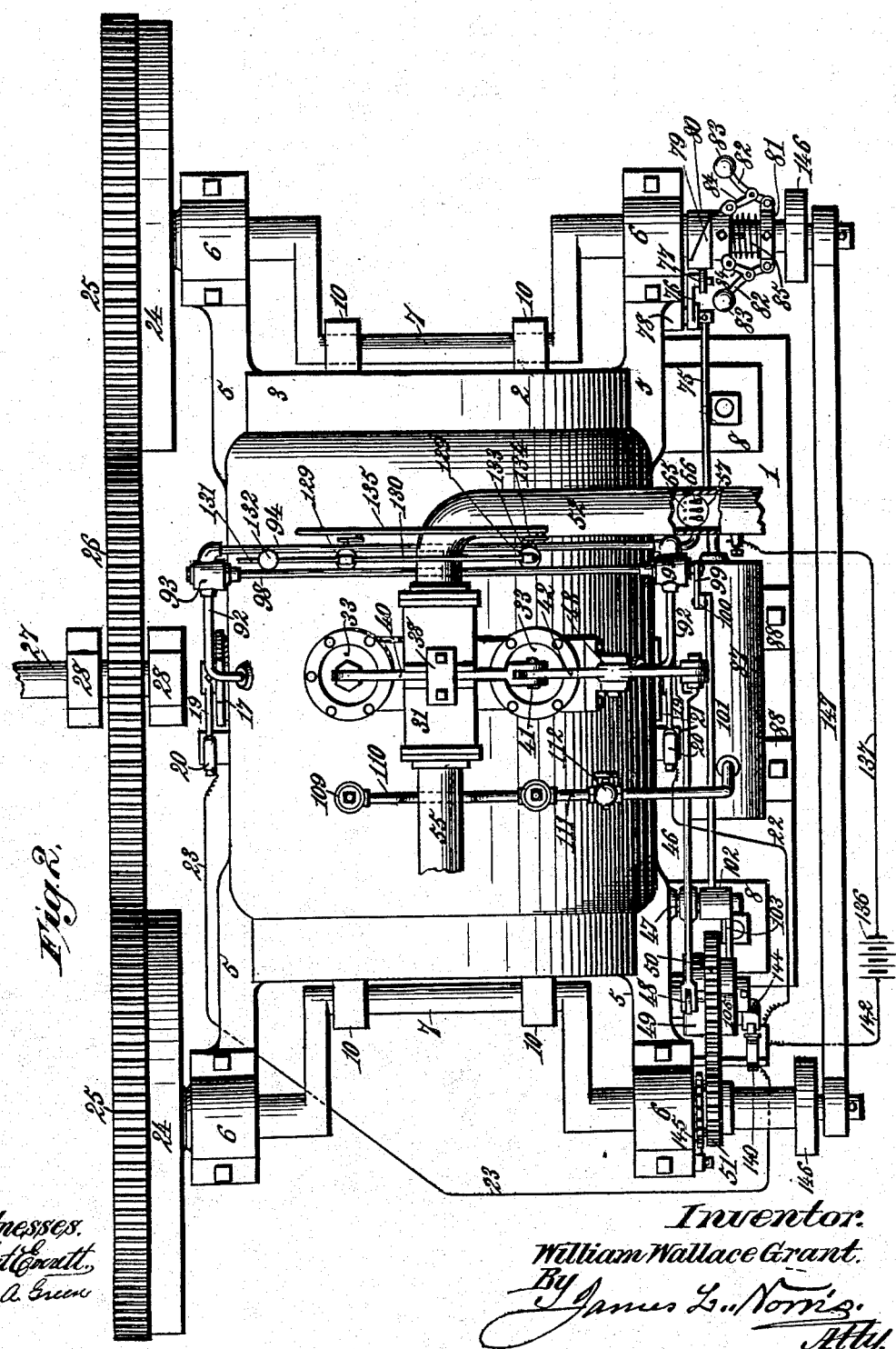

In the annexed drawings, illustrating the invention, Figure 1 is a side elevation of my improved gas-engine. Fig. 2 is a plan of the same. Fig. 3 is horizontal section of the engine. Fig. 4 is a vertical transverse section of the twin power-cylinders and their induction and exhaust chamber, showing the inlet and exhaust valve of one cylinder closed and the other open. Fig. 5 is a vertical longitudinal section of the induction and exhaust chamber. Fig. 6 is an enlarged sectional view of the atomizer with the blast-pipe and the pipe for supplying hydrocarbon in elevation. Fig. 7 is a top view of the atomizer and spraying-tubes. Fig. 8 is an enlarged sectional view of one of the valves for controlling the exit of a portion of the gases of expansion from a power-cylinder. Fig. 9 is a sectional view of a hollow valve-plunger. Fig. 10 is a sectional view of the oscillatory valves for controlling the taking of a portion of the gases of compression from the power-cylinders alternately. Fig. 11 shows a longitudinal section of one of said oscillatory valves. Fig. 12 is an enlarged view of the cam and lever through the action of which are opened the valves for controlling the charging and exhaust of the power-cylinders. Fig. 13 illustrates an application to an engine of an injector or atomizer blast produced by gases of expansion alone.

The engine bed or frame 1 may be of any suitable form and construction that will best adapt it to serve as an adequate support for the preferred type of twin-cylinder engine. Although I have shown the twin power-cylinders 2 and 3 as cast together, or in one piece, such construction is not essential. I prefer this general style, however, for strength, durability and compactness. The walls of the two cylinders are provided with water-jacket spaces 4, and are, preferably, so webbed together that the one body of jacket-water will circulate freely around both cylinders. At the ends of the power-cylinders, and preferably cast integral therewith, are the arms or brackets 5, Figs. 1, 2, and 3, on which bearings 6 are provided, for the crank-shafts 7, at opposite ends of the engine. The engine-cylinders may be bolted to the bed or frame 1, through lugs 8, at suitable points.

In each power-cylinder are two pistons 9, Fig. 3, arranged to simultaneously approach and recede from each other. The pistons in corresponding ends of the two cylinders are connected by pitmen 10 to the same crank-arm of the respective crank-shafts, which are suitably geared or connected in such manner that all the pistons will operate synchronously, and which may be positively secured by providing properly positioned cranks 146 upon the opposite ends of the crank-shafts and securing upon said cranks a connecting tie-rod or link 147. The ends of both cylinders are open, as shown, to permit a free working of the pitmen, the inner ends of which are pivotally attached in the open outer ends of the pistons. The inner or opposing faces of the pistons are concavely recessed, and thus, when nearly approached, they enter into the formation of an approximately-spherical explosion-chamber 11, in which the force of the explosion is concentrated on the concaved faces of the pistons, without waste of energy or communication of shock or jar to the cylinders. At its inner end the periphery of each piston is provided with an annular recess or rabbet 12 to prevent binding, and the usual expansion-rings 13 are placed on each piston to secure a proper working fit.

To provide for electrical ignition of the explosive charge, one electrode 14, Fig. 3, is mounted upon and reciprocates with one piston in each cylinder. For a portion of its length each electrode 14 is externally screw-threaded to engage a correspondingly-threaded bearing in the piston, and has on its rear or outer end a squared projection for attachment of a wrench, by which the electrode can be adjusted forward or back to suit the stroke of the engine. In the outer side of each power cylinder, about midway its length and height, is mounted a rocking electrode 15, Figs. 3 and 4, that projects laterally into the explosion-chamber between the concaved faces of the pistons. On the inner end of each rocking electrode 15 is a depending projection 16 for make-and-break contact with the electrode 14 on one of the pistons in each cylinder, and each electrode 15 is supported in a screw-plug 17 and suitably insulated from the cylinder in the manner shown and described in an application, Serial No. 523,815, filed by me September 22, 1894. To the outer end of each rocking electrode 15, on the outside of the engine, is secured by means of a set-screw 18, or otherwise, an arm 19, Figs. 1, 2 and 3, that is normally pressed downward into a horizontal position by means of a spring 20, secured to an insulating-block 21 fastened to the outside of the cylinder or engine-frame.

To the springs 20 are respectively connected the wires 22 and 23, each of which forms part of an electric circuit for one of the respective cylinders. Between the electrodes 14 and 15 in each cylinder there is effected a rubbing make-and-break contact on the near approach of the pistons and their subsequent separation, each reciprocating electrode 14 being caused to bear onto the projection 16 of the accompanying electrode 15, whereby the latter is rocked on its axis against the pressure of the spring 20 on the electrode-arm. The springs 20 return the rocking electrodes 15 to normal position when the pistons 9 recede from each other, and they also serve as conductors whereby, on the breaking of contact between the electrodes and with a proper condition of the circuit, a spark will pass to induce ignition of the explosive charge for giving impetus to the receding pistons. The means for separately controlling the electric circuit for each cylinder in such manner that the charging of one power-cylinder will take place simultaneously with the ignition, explosion and expansion of a compressed charge in the other cylinder will be hereinafter explained.

Each of the two opposite crank-shafts 7 may carry on one end a fly-wheel 24, Figs. 1, 2 and 3. I prefer to arrange both fly-wheels 24 on the same side of the engine and provide them with gears 25, meshing with an intermediate gear 26 on a horizontally-mounted shaft 27, that is thus driven by the engine, and from which power may be taken as required. By this mode of connecting the crank-shafts the required synchronous movements of the pistons in the twin cylinders will be aided. Any suitable means may be provided to prevent backlash on starting the engine. The driven shaft 27 is supported at a right angle to the engine in suitable bearings 28, and preferably in a central line coinciding with the center or crossing of the longitudinal and vertical axes of the power-cylinders. This line may, however, be raised or lowered according to requirements by employing a larger or smaller gear-wheel upon the driven shaft 27, meshing with properly-proportioned gears upon the crank-shafts or on the fly-wheels.

In the top of each power-cylinder 2 and 3 is a single charging and exhaust port 29, Fig. 4, controlled by a puppet-valve 30, that is inclosed in the cylinder. The ports 29 of the two cylinders communicate with the lateral branches of an approximately cross-shaped induction and exhaust chamber 31, Figs. 1, 2, 4 and 5, that is common to both cylinders, upon the tops of which it is constructed in such manner that its base or lower portion is partly integral with each cylinder. Each valve 30 is preferably constructed of steel, and with a conical inner or lower face and a conoidal upper or outer face corresponding with a similarly-beveled seat formed on the lower end of a hard-composition bushing 32, Fig. 4, screwed into an orifice provided therefor in the top of the cylinder and lower portion of the induction and exhaust chamber.

In the top of each lateral branch or extension of the induction and exhaust chamber 31 is secured a depressed and somewhat conical or funnel shaped guide 33 for the vertical stem 34 of the puppet-valve. In the funnel-shaped guide 33 is a stuffing-box 35 for the valve-stem. The stuffing-box also affords a bearing for one end of a spring 36 coiled around the valve-stem, and which, by means of a nut 37, may have its tension so adjusted as to normally cause a close and proper seating of the valve 30 in an upward direction.

By referring to Figs. 2 and 4 it will be seen that there is provided on the top and center of the induction and exhaust chamber 31 a bearing 38, in which is centrally fulcrumed, on the pin 39, a lever 40, that has one end adapted to bear down on the stem of the puppet inlet and exhaust valve 30 in one of the power-cylinders. The pressure of the lever 40 on the outer end of the valve-stem 34 will open the inlet and exhaust valve 30 in this cylinder 3, as shown in Fig. 4. The other end of the lever 40 has a loose-jointed pin-and-slot connection 41 with one end of a lever 42, that is fulcrumed at 43 on a lug 44 projecting from an adjacent portion of the induction and exhaust chamber. The lever 42 has its inner end adapted and arranged to bear down on the valve-stem and open the inlet and exhaust valve 30 in the power-cylinder 2 in the same manner that the lever 40 is arranged to open the corresponding valve in the other cylinder. It will be observed, by reference to Fig. 4, that these levers 40 and 42 are so mounted and arranged that when one lever is in position to open and hold opened the inlet and exhaust valve 30 of its proper cylinder the other lever will have its operating end raised, thereby releasing the valve to which it pertains and permitting it to close or be seated under the tension of its spring.

For the purpose of automatically effecting the required alternate operation of the inlet and exhaust valves 30 of the two cylinders, the outer end of the lever 42 is pivotally connected to the upper end of a vertically-arranged link, rod, or bar 45, Fig. 1, the lower end of which is pivoted to one end of a lever 46, fulcrumed on a suitable stud or support 47, Figs. 2 and 3, fixed to one side of the engine. The other end of this lever 46 is bifurcated, as shown in Fig. 12, and on each arm of the bifurcation is a friction-roller 48, to engage a cam 49, Figs. 2, 3, and 12, secured to the inner side of a gear-wheel 50, mounted upon a stud at one side of the engine and driven from a pinion 51 on the adjacent crank-shaft.

It will be seen that one of the rollers 48 is always above the cam 49 and the other below. The periphery of the interposed cam is in constant contact with both friction-rollers, and as one roller rides over the higher portion of the cam periphery the other rides along the lower portion. Thus the bifurcated end of the lever 46 is alternately raised and depressed, and through the link 45 the required rocking action in alternately opposite directions is imparted to the levers 42 and 40, by which the valves 30 of the two cylinders are in turn opened and held open for the length of time required for exhaust and for taking in a fresh charge. The action of the valve-levers, operated from the cam, is positive, and is effected in such manner as to depress, or open positively, first the one inlet and exhaust valve 30 and then the other. When relieved from the pressure of the cam-actuated levers, the valves 30 reseat themselves through the action of their springs 36, as before mentioned. The form of the cam 49, in the arrangement of its raised and depressed peripheral portions, is such that the inlet and exhaust valve 30 of each power-cylinder will operate, respectively, to stand open through all, or most all, of the exhaust and charging stroke, and to remain closed during all, or most all, of the compression and explosive or expansion stroke.

The induction and exhaust chamber 31, Fig. 4, has connected to one end an air-inlet pipe 52, Figs. 1, 2, and 5, which is preferably so curved (see Fig. 2) as to extend partly in a lateral direction for convenience of connection with the injector or atomizer and blast devices hereinafter described. In the chamber 31, at the inner end of the air-inlet pipe 52, is an inwardly-opening flap-valve 53, Fig. 5, for which is provided an inclined seat, that the valve normally rests on by gravity, although a spring to insure rapid seating may be provided, if so desired. An outwardly-opening flap-valve 54, of similar character, controls the exit to an exhaust-pipe 55, leading from the other end of the chamber, and may be provided with a spring to prevent striking against the roof of the inlet and exhaust chamber.

At a suitable point in the lateral extension of the air-inlet pipe 52 is attached a union 56, Fig. 6, for making connection with the atomizer 57, through the action of which a suitable hydrocarbon is vaporized, diffused or atomized, and delivered into the volume of atmospheric air, passing to and through the chamber 31, first to one power-cylinder and then to the other.

The body portion of the atomizer 57 may consist of a suitably-cored screw-plug engaged in a threaded orifice in the under side of the union 56, that also forms part of the main air-inlet pipe. This screw-plug or atomizer-body 57 has its interior formed with a centrally-vertical partition 58, Fig. 6, extended from top to bottom, and two compartments 59 and 60, that are separated from each other by the said intervening partition or wall. The lower portion of the hydrocarbon-compartment 59 is divided by a vertical wall 61, extended only part way to the top, and in the lower part of the blast-compartment 60 is a wall 62 of like character. The upper portion of the atomizer on one side of and adjacent to the central wall 58 is formed in such manner as to provide one or more vertical passages 63 for escape of hydrocarbon in an upward direction from the compartment 59, in the contents of which the lower end of each hydrocarbon-exit passage is submerged. One or more similar exit-passages 64 lead from the blast-compartment 60 on the other side of the central dividing-wall. The main body portion of the atomizer is thus preferably constructed in one piece, being properly cored to form the required compartments or passages and their separating walls or partitions; but the jet or spray tubes 65 and 66 for atomizing the hydrocarbon are separate parts that can be inserted or detached as required. There may be either a single jet-tube 65 for hydrocarbon or a group or series of such tubes, and in like manner a single blast-tube 66 or a group. Both sets of tubes are extended vertically into the main air supply that is passing through the inlet-pipe 52 to the engine-cylinders, and the blast-tubes 66 have their upper exit ends curved over (see Figs. 6 and 7) in the direction of the current and in close proximity to the ends of the tubes 65 from which the hydrocarbon is to issue. In order to permit access to the tubes 65 and 66 without detaching the atomizer, an opening may be provided in the top of the pipe-union 56, to be normally closed by a screw-cap 67, having a transparent panel 68, through which the working of the atomizer can be inspected.

The hydrocarbon or explosive-rendering material to be supplied to the atomizer may be conducted thereto through a pipe 69, Figs. 1 and 6, leading from any convenient source. This pipe 69 communicates with the compartment 59 in the atomizer, and is provided with a gravity-valve 70, to assist in maintaining a proper level of gasoline or other liquid hydrocarbon in the proper passages of the atomizer. The valve 70 is preferably in the form of a hollow ball filled with air, and may be provided with a depending guide-stem. The pipe 69 may also have a hand-valve 71 for regulating the quantity of hydrocarbon supplied to the atomizer. With the compartment 60 of the atomizer is connected a blast-pipe 72 for conveying the blast to atomize the hydrocarbon. The pipe 72 is provided with a cam-actuated and governor-controlled valve 73, that regulates the time of admission of the atomizing-blast, and also the duration of the atomizing-blast, according to the speed of the engine. It will be observed that the construction of the atomizer is well adapted to economize the agencies employed for rendering explosive the charge of atmospheric air or other gas through which the engine is operated. Upon entering the atomizer the blast from the pipe 72 must curve over the wall 62 and tend to expand evenly throughout the compartment 60, thus disposing toward an evenness of pressure through all the blast-tubes of a group when a group of such tubes is provided. Likewise in the other atomizer-compartment 59, wherein the hydrocarbon from the pipe 69 passes over the lower end or ends of 61 and submerges the lower end or ends of the passage or passages 63, there will be maintained a substantially constant level and uniform pressure of the hydrocarbon or other material to be sprayed or diffused in close proximity to the blast, and in such manner that the action of the atomizer will be most efficient and economical.

As a means for actuating the valve 73 to control the blast and regulate its duration, I have provided said valve with a crank-arm 74 connected by a rod 75 to one arm of a bell-crank 76, Figs. 1, 2, 3, and 13, on the other arm of which a roller 77 is mounted. The bell-crank 76 is supported on a stud or bracket-arm 78, Figs. 2 and 3, in such position that the roller 77 may be acted upon by a cam 79 forming part of the governor mechanism. This cam 79 is formed on a part of the periphery of a rotary and longitudinally-movable sleeve 80, Figs. 2 and 3, that is splined onto one of the engine crank-shafts. On the said crank-shaft is secured a collar 81, to which are jointed the arms 82 by which the governor-balls 83 are carried. The sleeve 80 is connected with the arms 82 by links 84, and between the longitudinally-movable sleeve 80 and fixed collar 81 is interposed a spring 85, through which a steady action of the governor is obtained. The governor-cam 79 has a triangular form, a plan view of which is shown in Figs. 2 and 3, and that part or line of said cam which first comes into contact with the roller 77 of the bell-crank 76 is straight, so that the period of engagement with the roller is always unvarying; but the time at which the cam passes out of contact with said roller is governed by the speed of the engine and by the angle or hypotenuse of the rear edge of the cam.

It is designed that when the engine is working at normal speed the governor-controlled valve 73 in the blast-pipe 72 shall be held open by the cam 79 during most of the charging stroke in one of the cylinders, or for so much of such stroke as may be necessary to secure the required explosiveness of the charge. A spring 86, Figs. 1 and 13, may be connected to the bell-crank 76 and serves to close or restore the valve 73 to normal position when released by the governor. The governor being set for the length of time that the valve 73 should remain open at normal speed of the engine, it will be obvious that the higher the speed the farther outward will be drawn the sleeve 80 and attached triangular cam 79, and consequently the sooner the roller will disengage from the cam, and, therefore, the injecting or atomizing blast will be shorter. On the other hand if the speed of the engine is decreased the roller 77 and cam 79 will remain longer in contact, and, consequently, the atomizing or spraying blast will be lengthened. Should the speed of the engine become very great and the governor-balls spread apart so far as to draw the cam 79 beyond the range of contact with the roller 77, the blast-valve 73 will not operate, and thus there will be no recurrence of the blast until the speed of the engine is sufficiently reduced to effect re-engagement between the cam and the roller.

It will be obvious that the blast delivered to the atomizer 57 through the pipe 72 may be produced or developed by an air-compressing pump, as in some forms of gas-engines; but it is one of the principal purposes of my present invention to provide for operating an injector or atomizer through the agency of a blast developed from a gas or gases derived from the contents of the power cylinder or cylinders. For this purpose I may practically and economically utilize a portion of the gases of compression before ignition and explosion of a charge, or a portion of the hot gases of expansion, or I may use gases of compression and gases of expansion together.

When it is proposed to construct the engine in such form that the gases of compression from the power cylinder or cylinders may be utilized for producing the atomizer-blast, it is preferable to provide a receiver 87, Figs. 1, 2, and 3, in which the gases for the blast may be temporarily confined and from which the blast-pipe 72 will then lead. This receiver 87 may be of cylindrical or other form, and may, if desired, have a suitable non-conducting covering to prevent loss of heat by radiation. I have shown the receiver 87 as arranged on the same side of the engine as the atomizer 57, and it may be securely supported by means of lugs 88, through which it is bolted to the engine bed or frame. At a suitable point the receiver 87 is provided with a pressure-gage 89, and it may also have a valved inlet 90 for connection with a pump, through which a suitable supply of compressed air or gas may be introduced for starting the engine.

The gases of compression that are to operate as a blast may be taken from the power-cylinders 2 and 3 alternately through openings 91, Fig. 4, that may be located at points midway the length of the cylinders, or thereabout, and preferably on the outer side of each cylinder. These openings 91 communicate through pipes 92, Figs. 1 and 2, with oscillatory valves 93, one of which is arranged on each side of the engine. The casings of the two opposite oscillatory valves 93 are connected by a pipe 94, Figs. 2 and 10, that is extended horizontally across the engine, and from that valve which is nearest the atomizer is extended a pipe 95 that connects with the atomizer blast-pipe 72, as shown in Fig. 1. Each oscillatory valve-plug is provided with a transverse passage 96, Fig. 10, that may be brought into coincidence with the pipes or passages through which the gases from the power-cylinders gain access to the atomizer-blast, and in each valve-plug are also longitudinal open-ended passages 97, Figs. 10 and 11, through which air will circulate to keep the valves cool. The two oppositely-arranged oscillatory valves 93 are connected by a rod or shaft 98, Figs. 2, 10, and 11, that permits said valves to oscillate together and in the same direction. These valves 93, as shown in Fig. 10, are set at right angles to each other, or in such manner that when one is open the other will be closed, and their actuating mechanism is so arranged that both valves will be closed when in normal position.

To one of the oscillatory valves 93 is secured a crank-arm 99, Figs. 1 and 2, connecting with a depending rod, link or bar 100, that in turn connects with one end of a lever 101, carried by a sleeve 102, Figs. 2 and 3, that is arranged to rock on the same stud 47 on which the lever 46 is fulcrumed. The sleeve 102 has an arm 103, provided with a friction-roller 104, Fig. 1, in contact with a cam 105 on one side of the gear 50, that is actuated from the pinion 51 on the adjacent crank-shaft. A spring 106, Fig. 1, serves to impart steadiness in holding the roller 104 against the cam. Beginning with the normal or closed position of both oscillatory valves 93, in which their respective passages 96 are inclined in opposite directions from a perpendicular, let it be supposed that the next movement of the cam-actuated levers will open the valve 93 that connects with, say, the power-cylinder 2, the valve being held open during a part of the revolution of the cam 105, and until compression in the said cylinder 2 is almost completed. In the meantime the valved passage 92, leading from the cylinder 3, remains closed, the two valves 93 being in the relative positions shown in Fig. 10. As the cam 105 continues to travel, the valve-levers are actuated in such direction that both valves 93 will be closed during explosion and expansion in cylinder 2, plus the charging of cylinder 3, and then the valve communicating with cylinder 3 will open until compression is almost completed therein. After this both valves return to normal position until explosion and expansion are completed in cylinder 3, plus the charging in cylinder 2, and then the valve communicating with cylinder 2 again opens and remains open until compression is almost completed in said cylinder, and so on. Thus but one only of the valves 93 is open at any time, or until compression is nearly completed in the cylinder with which it communicates, and both valves when in normal position are closed at the same time, or during explosion and expansion in the one cylinder and charging of the other cylinder. One of the said valves 93 also remains closed during exhaust from the cylinder to which it is connected and while compression of a charge is being accomplished in the other cylinder.

The pipe 95, Figs. 1 and 10, conducts gases of compression from the oscillatory valve or valves 93 to the atomizer blast-pipe 72 at a point between the cam-actuated and governor-controlled valve 73 and the receiver 87, and at this point is located a hand-operated three-way valve 107, Fig. 1, through which communication between the receiver 87 and pipe 95 may be cut off or re-established, as required. While the valve 107 remains open, or in such position as to establish communication between the pipe 95 and the receiver 87, the gases delivered by the valves 93 will be stored in the receiver under compression. The hand-valve 107, when properly turned or in its normal position, will also permit communication from the receiver 87 to the governor-controlled valve 73, and thus when the latter is periodically opened a blast will be delivered to the atomizer 57, whereby hydrocarbon will be drawn through the appropriate passages and tubes and delivered into the volume of atmospheric air passing onward to the cylinder that is to be charged.

A portion of the gases of expansion from the engine-charge may be utilized in the atomizer-blast, either with or without the gases of compression. The gases of expansion may be conducted directly to the atomizer blast-pipe, as when they are to be used alone, or they may be first stored in a receiver. The preferred mode of operation is the employment of a receiver when the engine is to be adapted to the utilization in an atomizer-blast of the compression alone or of the gases of compression and of expansion when used together.

For the purpose of utilizing the gases of expansion in connection with the gases of compression each power-cylinder may be provided with a gas-exit port primarily controlled by one of the pistons and located, preferably, in the top and toward one end of the cylinder. By locating such port toward one end of the cylinder it will be covered or closed by the piston at the period of explosion; but as the piston moves outward the port will be uncovered and permit a portion of the high-pressure gases of expansion to escape for subsequent use in the atomizer-blast. The escape of expanding gas from either power-cylinder is secondarily controlled by a normally spring-seated plunger 108, Figs. 8 and 9, forming part of a valve mechanism 109, Figs. 1, 2, 8 and 13, in communication with the expanding gas exit port of the cylinder. The casings of the valves 109 on the respective power-cylinders are connected with each other by a pipe 110, and may also communicate through a pipe 111 with the receiver 87, as shown in Figs. 1 and 2. From the receiver 87 the mingled gases of expansion and compression will gain access to the atomizer 57 through the blast-pipe 72 controlled by the governor-valve 73, already described.

In order to use the gases of compression alone, the three-way valve 107 will be turned to the position shown in Fig. 1, and the key-plugs 124, Fig. 8, or hand-valve 112 in the pipe 111, Fig. 2, will be closed, so as to cut off communication between the cylinders at the points occupied by the puppet-valves 109 and the receiver. When the hot gases of expansion are employed in connection with gases of compression they will assist expansion of the latter on release from the receiver, and will also more efficiently aid in the vaporization of hydrocarbon by the atomizer.

In Fig. 8 is shown a preferred form of construction for the valves 109, through which is controlled the flow of expanded gases from the cylinders for use in the atomizer-blast. The lower portion of the valve-casing 113 has an externally-threaded neck 114 for engagement in the cylinder-port to which the valve is to be connected. In the lower part of the casing is a vertical passage 115 for communicating with the cylinder-port and terminating above in a transverse passage 116 for connection with the pipe or pipes 110 and 111, through which the gas is to pass out. At its upper end the vertical passage 115 is provided with a tapering or beveled seat for the conoidal lower end of the plunger 108, Fig. 9, that is seated just below the bottom of the transverse valve-passage.

In the top of the transverse passage 116 is an opening through which the plunger 108 passes into a packing-chamber 117 formed in the upper part of the main valve-casing. This packing-chamber 117 is internally screw-threaded for engagement with the externally-threaded and vertically-perforated neck 118 of a spring-inclosing chamber 119, in which is placed the spring 120 by which the plunger 108 is normally seated. A screw-cap 121 is inserted in the internally-threaded top of the chamber 119 to form a bearing for the upper end of the spring 120, which has its lower bearing upon a shoulder or collar 122 on the plunger. The plunger may terminate at this shoulder 122, or it may be extended upward through the surrounding spirally-coiled spring 120 and pass out through a central opening in the cap. The centrally-bored neck 118 acts as a guide for the plunger 108, and the spring-inclosing chamber 119 will serve to contain a lubricant. It may be preferable to make the plunger 108 hollow, as shown in Fig. 9, to contain oil or other cooling medium. As the piston 9 of cylinders 2 and 3 uncover the ports to which these valves 109 are connected, the expanding gas, from the cylinder in which explosion has just occurred, will raise the valve-plunger 108 against the pressure of its spring 120 and hold it open until the gas-pressure sufficiently abates, when the valve will be reseated by its spring. By means of the screw-cap 121 the pressure to be exerted by the spring 120 may be adjusted as required. The valve 109 connected to cylinder 3 will have the outer end of its transverse passage 116 plugged, as no pipe connection will be required at that point for the present purpose. It will be seen that the pipe connections 110 and 111 leading from these valves are above the point where the valve-plunger 108 is seated, and that the transverse passage 116, through which the plunger works, is of larger diameter than the valve-passage 115, thus permitting a free passage of gas from the respective valves, but the pipe-passages 110 and 111 are preferably not larger than passage 115. Any suitable packing may be placed in the chamber 117 surrounding the valve-plunger. The opening in the bottom of the chamber is just sufficiently large to prevent contact with the plunger, while in the tubular guide-neck 118 the plunger will have a close working fit. The packing about the valve-plunger may be tightened by screwing down the spring-inclosing chamber 119, or it may be somewhat loosened by partly unscrewing said chamber. When the chamber 119 is screwed down the cap 121 may be correspondingly raised to compensate for the added pressure on the spring 120, and vice versa. If desired the cap 121 may be provided with vents 123.

The casing of each valve 109 has in its lower vertical passage a valve plug or key by which communication with the cylinder may be cut off in order to render the valve-plunger 108 inoperative. When these valves are to be employed to replace the oscillatory valves 93, as shown in Fig. 13, then said valves 109 are to be provided with a three-way valve-plug and with a threaded tubular nipple 125 at one side of the three-way plug or key 124, and a charging valve plug or key 126, which is designed to be opened for the purpose of injecting air and hydrocarbon into either power-cylinder for starting the engine, and when the gases of expansion are to be used alone in the production of an atomizer-blast, and when a sufficient charge has been injected, to be then closed and remain closed until again required for the same purpose of starting.

In Fig. 13 I have shown a preferred form or arrangement of parts, in which the receiver is omitted, as are also the parts 99 to 106, inclusive, as also the oscillatory valves 93, these latter being replaced by the valves 109 provided with the charging-nipple 125 and key 126, and connected by pipes 127 and 128 directly with the pipe 72 leading to the atomizer. This form of construction is designed for engines in which only the gases of expansion are to be used for developing the atomizer-blast, and is obviously more direct and economical than a construction requiring the employment of a receiver.

Although I have shown and described the oscillatory valves 93 as primarily designed for operation with gases of compression to be utilized in the atomizer-blast, they may be used instead for controlling the utilization of gases of expansion. For this purpose it will be only necessary to adjust the cam 105 to correspond in action with the expansion-stroke of the engine instead of with the compression-stroke, and the result will then be that these valves 93 will oscillate to alternately permit the passage of the hot gases of expansion to provide the atomizer-blast, and the three-way hand-valve 107 being turned to cut out the receiver 87 a direct passage for the hot blast to the atomizer will be secured upon the opening of the governor-valve 73 for that purpose; but if it is proposed to construct the engine for use of the gases of expansion only in developing the atomizer-blast, then the oscillatory valves 93 are preferably replaced by the valves 109, Fig. 8, arranged as shown in Fig. 13. When the hot gases of expansion are to be employed for the atomizer-blast, whether with the valves 93 or 109, the blast-connecting pipes between the cylinders, valves, and atomizer should be preferably covered with insulating or non-conducting material to offer a check to radiation of heat from said pipes.

As shown in Figs. 1 and 2, I may connect with each cylinder 2 and 3 a valve 129 of any suitable construction. These valves 129 are connected by a pipe 130, Fig. 2, and from them leads a pipe 131, with which a whistle 132 may be connected. Each of these valves 129 has an oscillatory valve-plug 133, Fig. 2, having a crank-handle 134, Fig. 2, for connection with a reciprocating rod or lever 135, through which both valve-plugs may be simultaneously operated to cut off or establish communication with the cylinders. These valves are normally closed or cut off from the engine-cylinder, but may be opened to operate the whistle or for use with an ejector.

Electric energy to produce a spark for igniting a charge in either power-cylinder may be furnished by a battery 136, Fig. 2, located at any convenient point and having one pole connected by a wire 137 to some portion of the engine, preferably at or near the atomizer. In order to complete and so control the circuit that an explosion will be effected in the cylinders 2 and 3 alternately, three contact-springs 138, 139, and 140 will be mounted on an insulating-block 141, Fig. 1, secured to one of the engine-brackets 5, or other suitable support. One of the outer contact-springs, as 138, is connected to the wire 22 that connects with the spring 20, which bears on and makes electrical connection with the arm 19 of the oscillatory electrode 15, mounted in the power-cylinder 2, and the other outermost contact-spring 140 connects in like manner, through the wire 23, with the oscillatory electrode in the power-cylinder 3, as shown in Fig. 2. At its lower end the intermediate contact-spring 139 connects, through a wire 142, with the battery 136, or other source of electric energy. The upper end of this intermediate spring 139 projects in the path of an insulated roller 143, carried by an adjustably-mounted arm 144, Fig. 1, that revolves with the gear 50 and bears on the said spring 139 in every other complete revolution of the crank-shaft pinion 51, from which said gear is driven. When free from the pressure of the roller 143, the spring 139 will be in normal contact with the spring 138, through which it will thus connect with the wire 22, that connects with the oscillatory electrodes 15 in the power-cylinder 2, and therefore when the pistons in this cylinder approach and cause the electrodes 14 and 15 to make contact the electric circuit will be completed at the end of the compressing-stroke in said cylinder. As the pistons recede and the electrodes 14 and 15 separate from each other, the circuit will be broken, the charge will be exploded by electric sparking, and the expanding gases will give increased impetus to the outward-moving pistons. The pistons in both cylinders move outward at the same time, and while expansion is thus taking place in the power-cylinder 2 the cylinder 3 will be receiving a charge. On the inward movement of the pistons in both cylinders exhaust will be accomplished in the cylinder 2, its valve 30 being open, and compression of the charge in cylinder 3 will be effected, the valve 30 in that cylinder being closed. By the revolution of the gear 50 the insulated roller 143, Fig. 1, will be caused to break the normal contact between springs 138 and 139 and press the said spring 139 into contact with the spring 140, which connects, through wire 23, with the oscillatory electrode 15 in cylinder 3, and thus, as the electrodes in said cylinder 3 come together and again separate, the electric spark thereby induced will ignite and explode the charge in that cylinder. As soon as released from pressure of the insulated roller 143 the spring 139 will return to normal contact with spring 138, so that the circuit in cylinder 2 will be completed when the electrodes in that cylinder again make contact at the end of the next compressing-stroke therein. Thus explosion will take place in the two cylinders alternately, and only at the end of the compressing-stroke in each, or just after the pistons have completed their inward movement and commenced to move outward. At the end of the exhaust-stroke in each cylinder, though the electrodes 14 and 15 make and break contact, there will be no spark, because the circuit is broken either between the contact-springs 138 and 139, or between springs 139 and 140, as the case may be. The springs 20, Fig. 3, bearing on the electrode-arms 19 will return the oscillatory electrodes 15 to normal position as soon as they are relieved from the pressure of the electrodes 14 carried by the pistons.

A pawl-and-ratchet mechanism 145, Figs. 1, 2, and 3, may be arranged in connection with one of the engine crank-shafts, or other appropriate part, to prevent any tendency to backlash in starting. In an engine arranged for developing an injecting or atomizer blast by either the gases of compression or gases of expansion, or both together, the valves already described will be adjusted in the manner required for the mode of operation desired, as hereinbefore explained. At the beginning of the outward stroke of the pistons in the two cylinders there will take place in one cylinder an explosion and expansion of the previously-compressed charge therein, while the other cylinder will, by suction, take in a fresh charge, rendered explosive by the simultaneous, or approximately simultaneous, action of the injector or atomizer. If the atomizer-blast is developed wholly by gases of expansion they may be now taken directly to the atomizer from that cylinder in which expansion is at this time occurring, and thus one power-cylinder will directly supply to the atomizer a blast to aid in rendering explosive a charge that is being simultaneously drawn into the other cylinder; but if gases of compression are to be used in the atomizer-blast, or gases of expansion and compression together, they will be taken from the receiver 87, in which they are confined under pressure until needed. In either event the opening of the governor-controlled valve 73, through which the atomizer-blast is released, will be simultaneous with—or, if so desired, later than—the commencement of charging in one of the cylinders, and by the action of the governor, through the cam 79 and intermediate mechanism, the atomizer will operate at and for the length of time required to accord with the desired normal speed of the engine. On the return inward stroke of the engine-pistons there will be an exhaust from the cylinder in which explosion and expansion last occurred, while compression of a charge will be effected in the other cylinder. Just after the pistons have commenced their next outward stroke an explosion will take place in the charged cylinder and charging will commence in the other cylinder, the cycle being completed and an explosion produced in one cylinder or the other, alternately, at each revolution of the engine crank-shaft.

Though "hydrocarbon" is the term I have herein most generally employed to designate material employed to effect an explosive action for the purposes as herein set forth, I do not thereby intend to limit myself to the use of hydrocarbon only, but I intend to embrace thereunder and within my meaning any and all bodies capable of effecting an explosive compound, after the manner and for the purposes as herein described.

The provision of balancing-cranks 146 on the engine-shaft 7, and connection of these cranks by a continuous tie rod, bar, or link 147, will greatly aid in securing the required synchronous action of the pistons in the power-cylinders, for while the shaft-connecting gears 25 and 26 will also contribute somewhat to this result it is preferable that the synchronism should be made positive through employment of the crank-and-link connection. One of the balancing-cranks 146 is located on an engine-shaft outside the pinion 51 and the other is carried on the end of the other shaft outside the collar 81 of the governor. The connecting rod, bar, or link 147 is continuous and rigid from end to end and the cranks are preferably balanced or weighted to counterbalance the connecting bar or link.

Although I have shown at 57, Fig. 6, a form of injecting device commonly known and expressed as an "atomizer," I have not thereby intended to limit myself to the employment merely of the type of device shown, but would be understood instead as embracing within my meaning any form of injector that can be made to operate for or toward the effecting— for utilizing in the operation of the engine— of an inflammable or explosive compound, through the agency, or by the means substantially as herein set forth, of gas or gases from within a power-cylinder or power-compartment thereof.

What I claim as my invention is—

1. In a gas or vapor engine, the combination with twin power cylinders, of an induction and exhaust chamber common to both cylinders, an injector or atomizer communicating with said chamber, and pipes or passages adapted to take gas or gases from within said cylinders, alternately, to operate the injector or atomizer, substantially as described.

2. In a gas engine, the combination of twin power cylinders, an induction and exhaust chamber common to both cylinders, an injector or atomizer communicating with said chamber, and valved pipes or passages for taking gas from within said cylinders, alternately, to operate the injector or atomizer, substantially as described.

3. In a gas engine, the combination with twin power cylinders having valved ports for the exit of gas and each provided with an induction and exhaust port, of an injector or atomizer adapted to communicate with the induction and exhaust port of each cylinder, alternately, pipes or passages for taking gas from within said cylinders, alternately, to operate the injector or atomizer, and a governor-controlled valve to determine the period and duration of the blast, substantially as described.

4. In a gas engine, the combination with twin power cylinders having pistons adapted to control a gas exit port from each of said cylinders, an induction and exhaust chamber common to both cylinders, and an injector or atomizer communicating with said chamber, of normally spring seated puppet valves attached to gas exit ports of the power cylinders and adapted to be opened alternately by the pressure of expanding gases within the cylinders, a pipe through which said valves are adapted to communicate with the injector or atomizer, and a cam actuated and governor-controlled valve located in said pipe to control an atomizer blast developed by gases from within the power cylinders, substantially as described.

5. In a gas engine, the combination with twin power cylinders, an induction and exhaust chamber common to said cylinders, and an injector or atomizer communicating with said chamber, of a gas receiver communicating with the power cylinders, valves for controlling the exit of gases from said cylinders to the said receiver, a blast pipe leading from the gas receiver to the atomizer, and a cam actuated and governor controlled valve located in the blast pipe to determine the period and duration of the atomizer blast, substantially as described.

6. In a gas engine, the combination of twin power cylinders having valved ports or passages for the exit of gases of compression and valved ports for the exit of gases of expansion, a gas receiver in communication with the said valved gas exit ports of the cylinders, an injector or atomizer, a blast pipe leading from the gas receiver to the atomizer, a cam actuated and governor controlled valve located in said blast pipe, and hand valves to cut off the admission into the said receiver of either gases of compression or gases of expansion, whereby said gases may be utilized in the atomizer blast either separately or together, substantially as described.

7. In a gas engine, the combination of twin power cylinders having gas exit ports or passages controlled by automatically actuated valves, a gas receiver in communication with said valves, an atomizer, a blast pipe leading from the gas receiver to the atomizer, a valve located in said blast pipe, a bell-crank having one of its arms connected with the valve in the blast pipe and its other arm provided with a roller, a rotary and longitudinally movable sleeve mounted on an engine shaft and carrying a triangular cam adapted to come in contact with the bell-crank roller and open the valve in the atomizer blast pipe, and a governor connected with said cam carrying sleeve to determine the duration of the atomizer blast, substantially as described.

8. In a gas engine, the combination of twin power cylinders, an atomizer, a gas receiver, a blast pipe leading from the gas receiver to the atomizer, a cam-actuated and governor-controlled valve located in the blast pipe, exit passages for gases of compression leading from the power cylinders and connecting with the blast pipe at a point between said valve and the receiver, a hand operated three-way valve at the junction of the blast pipe and said passages for gases of compression from the power cylinders, automatically actuated oscillatory valves located in said passages and so connected and arranged as to alternately permit the exit of gases of compression from the power cylinders, spring seated puppet valves connected with gas exit ports of the power cylinders and adapted to open alternately to the pressure of gases of expansion within said cylinders, pipes connecting said puppet valves with each other and with the gas receiver, and a hand valve located in the pipe leading from said puppet valves to the gas receiver, substantially as described.

9. In a gas engine, the combination of twin power cylinders, an atomizer for hydrocarbons, normally spring seated puppet valves connected with gas exit ports of the cylinders and adapted to open, alternately, to the pressure of expanding gases within the power cylinder to permit the utilization of said gases in the atomizer blast, means for controlling communication between said valves and the atomizer blast pipe, a three-way rotary valve plug between each puppet valve and the cylinder to which it is attached, to cut off communication between the cylinder and its said puppet valve, and a valved passage adapted to communicate with said rotary three-way valve plug to permit attachment of a pump for charging the cylinder in starting, substantially as described.

10. In a gas engine, the combination with a power cylinder having an exit port for gases of expansion, of a puppet valve connected with said port and comprising a casing, a hollow or tubular valve plunger, a packing chamber surrounding a portion of said plunger, a spring inclosing chamber having a neck screwed adjustably into said packing chamber, a valve spring, a cap for the spring inclosing chamber, and a hand-valve plug between the cylinder and the spring-seated valve plunger, substantially as described.

11. In a gas engine, the combination of a power cylinder, a main air or gas supply pipe, an atomizer communicating with said main supply pipe and having separate tortuous passages for hydrocarbon and a blast, spraying and blast tubes connected with said passages and projecting into the main volume of air or gas for charging the engine, a valved hydrocarbon supply pipe leading to the hydrocarbon passages of the atomizer, a blast pipe connecting with the blast passages of the atomizer, and a cam actuated and governor controlled valve located in said blast pipe, substantially as described.

12. In a gas engine, the combination of a power cylinder, a main supply pipe for gas or air to charge the power cylinder, a union located in said pipe, an atomizer located in an opening in the under side of said union and projecting therein, and a removable cap having a transparent panel in the top of said pipe union to permit inspection and adjustment of the atomizer tubes, substantially as described.

13. In a gas engine, the combination of twin power cylinders each having a single charging and exhaust port, each port controlled by a single valve, an induction and exhaust chamber common to said cylinders and provided with valves that alternately open to inlet and exhaust, an exhaust pipe leading from one end of said chamber, an inlet pipe connected with the other end of said chamber for inlet of the main supply of gas or air to charge the cylinders, a hydrocarbon atomizer located in said pipe, a blast pipe leading to the atomizer, and a cam-actuated governor controlled valve located in the said atomizer blast pipe, substantially as described.

14. In a gas engine, the combination of twin power cylinders, each having in its top a single charging and exhaust port, an induction and exhaust chamber common to the charging and exhaust ports of both cylinders, normally spring seated puppet valves controlling said charging and exhaust ports and having their stems extended through the induction and exhaust chamber, a pair of connected levers fulcrumed above the cylinders and adapted to bear on the stems of said valves to open and hold open the valve of one cylinder during exhaust and charging while the valve in the other cylinder remains closed during compression, explosion, and expansion, a depending link or rod connected to an end of one of said valve levers, and a cam actuated lever connected to the other end of said link, substantially as described.

15. In a gas engine, the combination of twin power cylinders, each having a single charging and exhaust port, an induction and exhaust chamber common to the charging and exhaust ports of both cylinders, normally spring seated puppet valves controlling said ports and having their stems extended through the said induction and exhaust chamber, a pair of pivotally connected valve levers fulcrumed intermediate their ends and adapted to open said valves alternately, a link or rod connected to an end of one of said valve levers, a lever fulcrumed at the side of the engine and having one end bifurcated and at the other end connected to said link, and a rotary cam engaged in the bifurcated end of said lever and adapted to positively control the opening of the cylinder valves, substantially as described.

16. In a gas engine, the combination of twin power cylinders that each have a single valve controlled charging and exhaust port, two simultaneously approaching and receding pistons mounted in each cylinder, shafts mounted at opposite ends of the cylinders and each having a single crank to which the pistons of both cylinders are connected, gearing connecting said shafts, an oscillatory electrode mounted in each cylinder and insulated therefrom, an electrode carried by a piston in each cylinder, a circuit controller comprising three insulated contact springs, two of which are in normal contact with each other, means for establishing electrical connection between each oscillatory electrode and one of the outermost contact springs in the said circuit controller, a battery having one pole in electrical connection with the intermediate spring of the circuit controller and the other pole in electrical connection with the engine, and an insulating roller arm carried by a rotary part and adapted to bear against the intermediate spring of the circuit controller to shift its position and change the direction of the electric current, whereby an explosion may be effected in one cylinder or the other at each revolution of the engine, substantially as described.

17. In a gas engine, the combination with the twin power cylinders, and the oscillatory valves 93 communicating, respectively, with said cylinders and connected with each other to open alternately for the passage of gases from the said cylinders to be used in an atomizer blast, of the cam 105 on one of the engine-shafts, and lever mechanism connecting said cam with one of the said oscillatory valves, substantially as described.

18. In a gas engine, the combination with the twin power cylinders, and the oscillatory valves 93 communicating, respectively, with the said cylinders, of a rod or shaft connecting said valves and to which they are secured in such position as to open, alternately, for the passage of gases from said cylinders to be used in an atomizer blast, a crank 99 connected to one of said valves, a link 100 depending from said crank, a lever 101 connected to said link and provided with an arm 103, and the cam 105 mounted in position to act on said lever arm to operate the oscillatory valves, substantially as described.

19. In a gas engine, the combination with the twin power cylinders and their charging valves 30, of the levers 40, 42, link 45, bifurcated lever 46 having rollers 48, and the cam 49 mounted in constant contact with the rollers carried by said bifurcated lever, substantially as described.

20. In a gas engine, the combination with the twin cylinders, each having two pistons, and the crank shafts at opposite ends of the engine, the pistons in each end of the two cylinders being connected to the same crank arms, and gearing connecting the engine crank shafts, of balanced cranks on ends of the engine shafts, and a continuous rod, bar or link connecting said balanced cranks which are weighted to counterbalance the said rod, bar or link, whereby a synchronous movement of the pistons is maintained unimpaired by wear of the gear teeth, substantially as described.

21. In an engine, the combination of the twin cylinders and their pistons, the engine crank shafts, each having a fly wheel and a gear on one end, an intermediate gear connecting the gears of said shafts, balanced cranks on the opposite ends of the engine shafts, and a continuous rod, bar or link connecting said cranks, substantially as described.

22. In a gas engine, the combination with a power cylinder, and an injector blast pipe, of the oscillatory valve 93 adapted to establish communication between the power cylinder and the blast pipe and provided with air passages 97 for the circulation of air to cool said valve, substantially as described.

In testimony whereof I have hereunto set my hand and affixed my seal in presence of two subscribing witnesses.

WILLIAM WALLACE GRANT. [L. S.]

Witnesses:
WILLIAM J. LYNCH,
HENRY MEYERHOLZ, Jr.